United States Patent [19]

Aschwanden

[11] Patent Number: 4,575,757
[45] Date of Patent: Mar. 11, 1986

[54] PAL OFFSET GENERATOR

[75] Inventor: Felix Aschwanden, Thalwil, Switzerland

[73] Assignee: RCA Corporation, Princeton, N.J.

[21] Appl. No.: 487,861

[22] Filed: Apr. 22, 1983

[51] Int. Cl.$^4$ ............................................. H04N 5/06
[52] U.S. Cl. .................................... 358/150; 358/158; 331/20; 331/46; 455/259
[58] Field of Search .................. 358/13, 17, 19, 148, 358/149, 25, 150, 158; 331/1 R, 18, 20, 25, 46, 47, 51, 55, 57; 375/97; 455/259, 265

[56] References Cited

U.S. PATENT DOCUMENTS 3,571,513 3/1971 Ward et al. ............................ 358/150
4,278,994 7/1981 Van der Valk ........................ 358/25

Primary Examiner—Tommy P. Chin
Assistant Examiner—Michael D. Parker
Attorney, Agent, or Firm—Eugene M. Whitacre; Henry I. Steckler; Lawrence C. Edelman

[57] ABSTRACT

A color subcarrier generator for PAL uses a one-quarter horizontal frequency signal from a sync generator to sample the subcarrier signal. The sampled signal is phase and frequency compared with a 25 Hz (one-half vertical frequency) signal from the same sync generator to control the frequency of the subcarrier signal. Thus the required 25 Hz PAL offset is obtained. The one-quarter horizontal frequency sampling signal can also be used in NTSC and SECAM subcarrier generators.

9 Claims, 5 Drawing Figures

PAL OFFSET GENERATOR

BACKGROUND OF THE INVENTION

The present invention relates to television color subcarrier generators, and more particularly, to one for the PAL (phase alternating line) standard.

In the PAL color standard, the phase of the color subcarrier (as measured by its initial zero axis crossing) relative to the horizontal sync pulse repeats every 8 fields (4 frames). Further the frequency of the subcarrier is an odd multiple plus either one (PAL-N) or three (PAL-B) quarters of the horizontal frequency. In addition, there is an offset of 25 Hz, which is one half vertical frequency, added to the color subcarrier frequency to produce motion of the color dot pattern that occurs upon display, thereby reducing its visibility. During certain operations, such as tape editing, it is important that the phase relationship be held within tight tolerances to avoid picture disturbances, see "E. B. U. Review Technical Report" No. 172. In particular, the E. B. U. proposes that the tolerance be ±2.5°.

A typical prior art circuit for generating the PAL subcarrier signal having the 25 Hz frequency offset uses mixers, phase shifters, and frequency dividers. In general, due to aging and temperature drifts, the above components may introduce phase errors into the subcarrier signal ($f_{sc}$) relative to horizontal sync greater than said tolerances.

It is therefore desirable to provide a color subcarrier generator having a high degree of phase accuracy.

SUMMARY OF THE INVENTION

Method and apparatus comprising generating a television color subcarrier signal, sampling said subcarrier signal using a sampling signal having a frequency of one quarter of the horizontal frequency, filtering the thus sampled signal, and controlling the frequency of said subcarrier signal with the filtered signal.

DESCRIPTION OF THE DRAWINGS

FIG. 3a is a schematic diagram of FIG. 2, while FIGS. 3b, c, and d show waveforms present in FIGS. 2 and 3a;

FIG. 5a shows genlocking the embodiment of FIG. 4, while FIGS. 5b and c show waveforms present in FIG. 5a.

In the drawings corresponding numbers have been given to corresponding elements.

DETAILED DESCRIPTION

Figure 1:
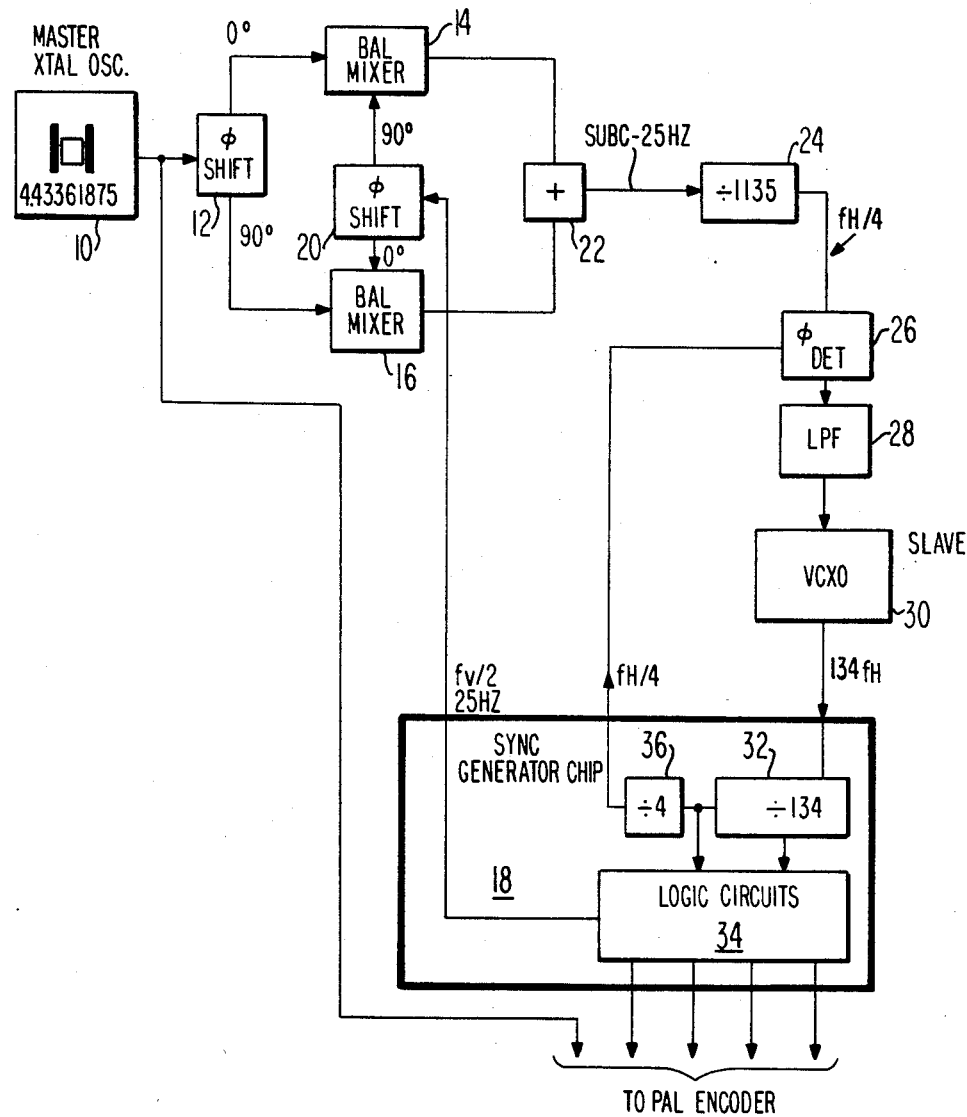
FIG. 1 is a block diagram of a typical prior art generator.

FIG. 1 shows a typical prior art PAL offset generator. A master crystal oscillator 10 provides a subcarrier signal $f_{sc}$ (4.43361875 MHz) to a PAL encoder (not shown) and to phase shifter 12, which shifter 12 provides subcarrier signals having 0° and 90° phase shifts to balanced mixers 14 and 16, respectively. A sync generator chip 18, only the portion relevant to the present invention being shown in FIG. 1, provides an $f_v/2$ (25 Hz) signal to phase shifter 20, which shifter 20 provides 0° and 90° phase shifted $f_v/2$ signals to mixers 16 and 14, respectively. The output signals from mixers 14 and 16 are applied to adder 22.

The output signal from adder 22 theoretically is a pure $f_{sc}-25$ Hz signal. However, due to aging and temperature drifts, phase shifts and spurious frequencies occur. The latter may cause frequency jitter of an $f_H/4$ signal, but are removed by a slave crystal oscillator (described below) and therefore can be neglected. However, the phase errors cause errors in the $f_{sc}$ signal and are therefore more serious. Further the output signal from adder 22 is applied to divide-by-1135 divider 24, which divider 24 also introduces phase errors due to temperature drifts.

The output signal from divider 24 comprises an $f_H/4$ signal and is applied to phase detector 26, which detector 26 receives another $f_H/4$ signal from sync chip 18. The output error signal from detector 26 is smoothed by LPF (low pass filter) 28 and applied to control the frequency of slave VCXO (voltage controlled crystal oscillator) 30. As mentioned above VCXO 30 removes suprious frequencies. The output signal from VCXO 30 is a $134f_H$ signal, which signal is applied to a divide-by-134 frequency divider 32 in chip 18. Signals derived from various stages of divider 32 are applied to logic circuits 34 to decode various sync signals, which sync signals are applied to said PAL encoder (not shown), all as known in the art. One signal from circuits 34 comprises an $f_v/2$ signal that is applied to phase shifter 20. The final stage output signal from divider 32 is an $f_H$ signal that is applied to divide-by-4 divider 36, which divider 36 provides the $f_H/4$ signal to phase detector 26.

Figure 2:
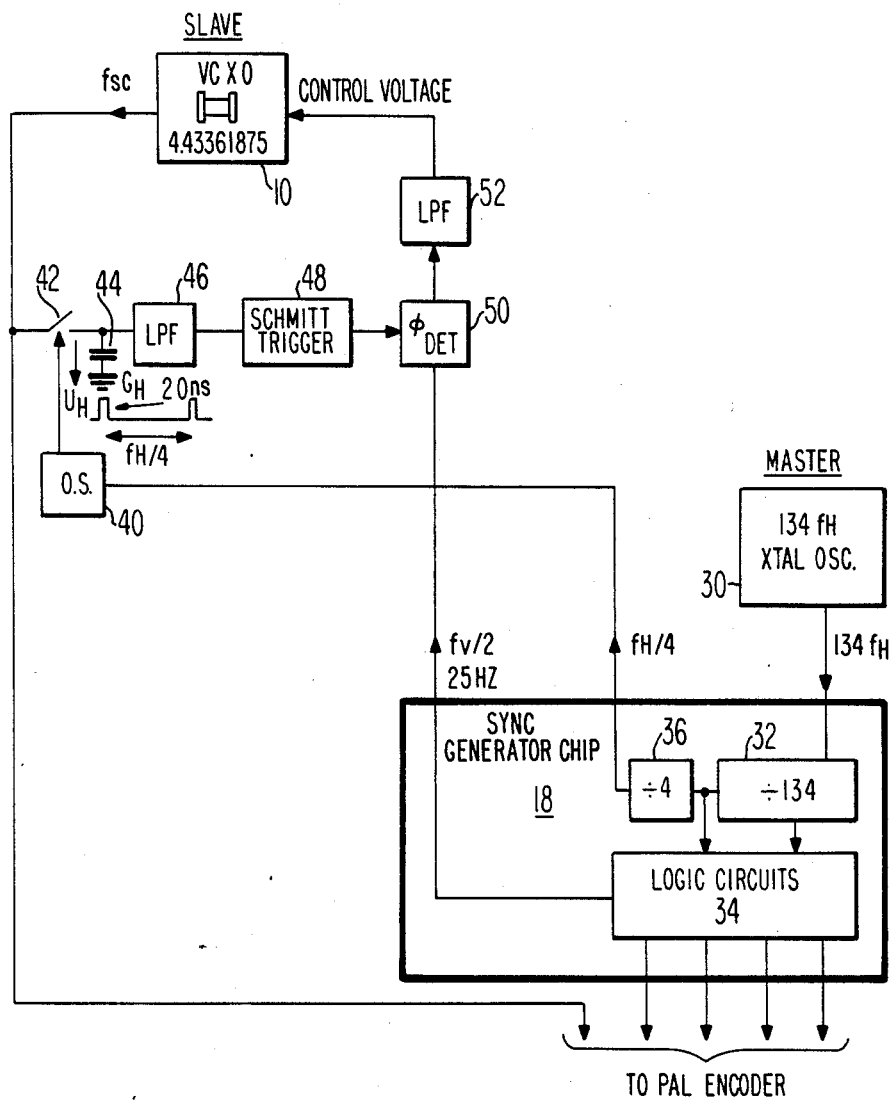
FIG. 2 is a block diagram of a first embodiment of the invention.

FIG. 2 shows a block diagram of a first embodiment of the invention. Oscillator 30 is now the master oscillator and provides a $134f_H$ signal to chip 18, while oscillator 10 is now the slave oscillator. As in FIG. 1, chip 18 supplies $f_H/4$ and $f_v/2$ signals. The $f_H/4$ signal is applied to one-shot (monostable multivibrator) 40. One-shot 40 provides a 20 ns sampling pulse at the $f_H/4$ rate as a switching control signal to sampling switch 42 in order to sample the $f_{sc}$ signal from VCXO 10.

The sampling apparatus is illustrated in more detail in FIG. 3a, wherein the sampled signal is applied to hold capacitor 44. The sine wave 301 of FIG. 3b represents $f_{sc}$ and the heavy dots 302 represent the sampling instants. It should be noted that FIG. 3b is not to scale as there are actually 1135 cycles of $f_{sc}$ between sampling instants. The sampled signal is applied to hold capacitor 44, the voltage thereacross being $U_H$. If $f_{sc}$ is exactly an integer multiple of $f_H/4$, then $U_H$ is a D.C. voltage, since $f_{sc}$ is being sampled at exactly corresponding points in its cycles. The D.C. voltage is applied to LPF 46, which typically has a cut-off frequency of 1 kHz, and then to Schmitt trigger 48. Trigger 48 provides a constant voltage under the above-described conditions (since its input voltage does not change) to phase detector 50. The other input of detector 50 is the $f_v/2$ (25 Hz) signal from chip 18. Thus a frequency error voltage is produced by detector 50 and applied through LPF 52, which comprises an integrator, to the frequency control input of VCXO 10, thereby setting the frequency thereof to have the 25 Hz offset.

Once the frequency of VCXO 10 has the required 25 Hz offset, then $U_H$ is a 25 Hz signal having $f_H/4$ components as shown in FIG. 3c, which components are removed by LPF 46 as shown in FIG. 3d. This waveform is converted into square waves by trigger 48 and then phase compared with the $f_v/2$ signal from chip 18 in comparator 50. A phase error voltage produced by detector 50 is supplied to VCXO 10 to control the phase of the output signal produced thereof. The high Q of the crystal (not shown) in VCXO 10 makes the frequency control range thereof small compared with $f_H/4$, and thus prevents locking up to the wrong harmonic of $f_H/4$ plus the 25 Hz offset.

It will be readily appreciated that phase shifts caused by aging and temperature drifts in mixers and phase shifters are absent from the circuit of the invention since such components are absent.

Figure 3:
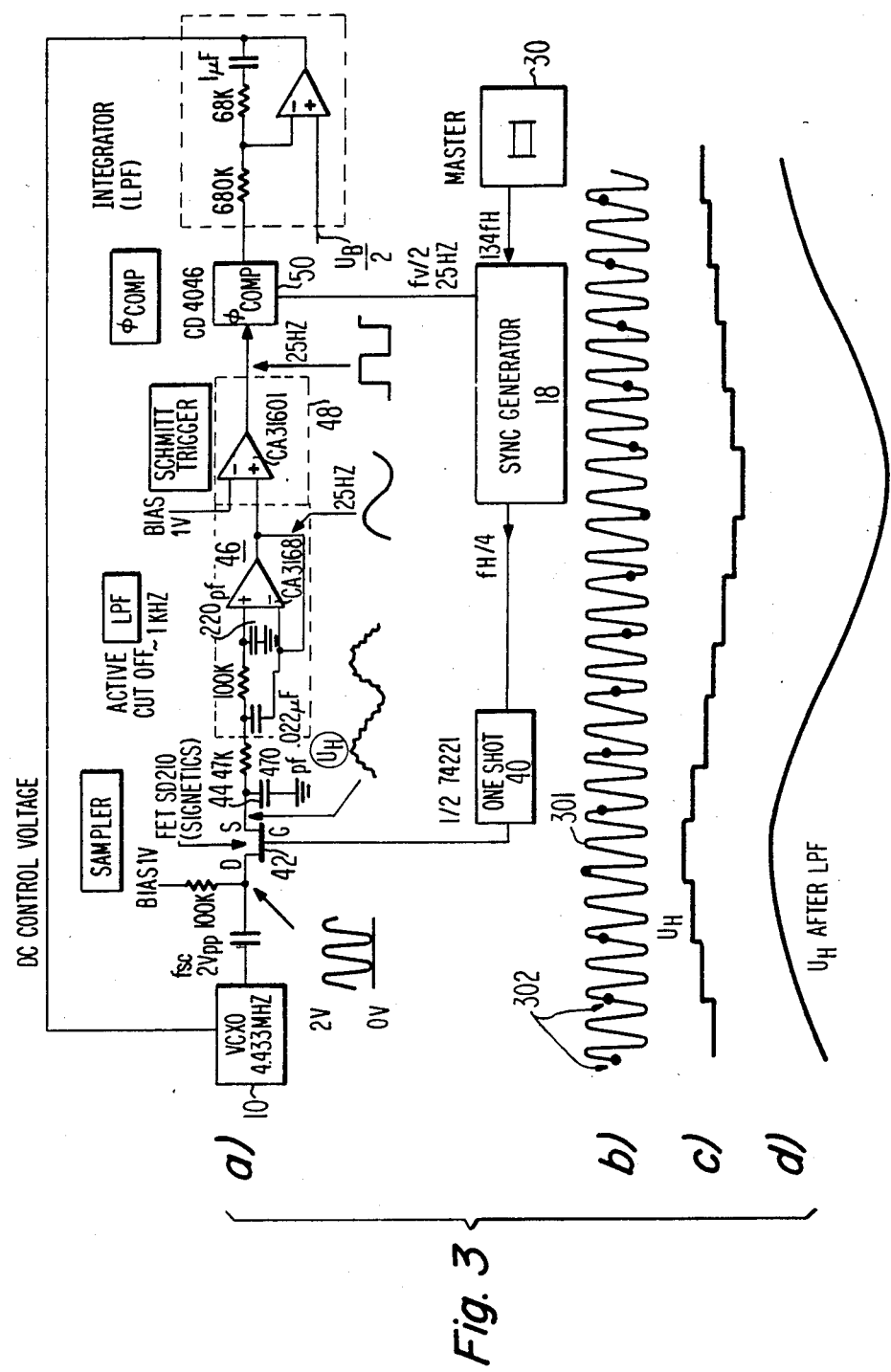
Figure 4:
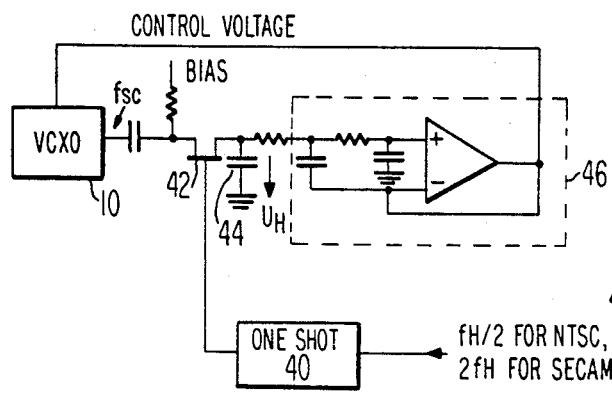
FIG. 4 is a schematic diagram of a second embodiment of the invention.

As shown in FIG. 4, by deleting Schmitt trigger 48 and phase comparator 50 in FIG. 3 and connecting the output of LPF 46 to the control input of VCXO 10, the circuit then would also be useful for subcarrier generation in NTSC, PAL-M and SECAM by simply changing the crystal (not shown). For NTSC and PAL-M the subcarrier is an exact integer multiple of $f_H/2$, while it is an exact integer multiple of $2f_H$ for SECAM, i.e., there is no 25 Hz offset for said three standards. Therefore the sampling pulse train can be an $f_H/2$ or a $2f_H$ signal, respectively, rather than an $f_H/4$ signal. Because $f_H/2$ and $2f_H$ are integer multiples of $f_H/4$, the $f_H/4$ pulse train can be used as sampling frequency for all world TV standards. As a result the construction of a multi-standard subcarrier generator becomes easy, which is important for multi-standard products such as cameras and recorders. It should be noted that also for NTSC, an $f_{sc}$ —H sync phase requirement does exist.

Figure 5:
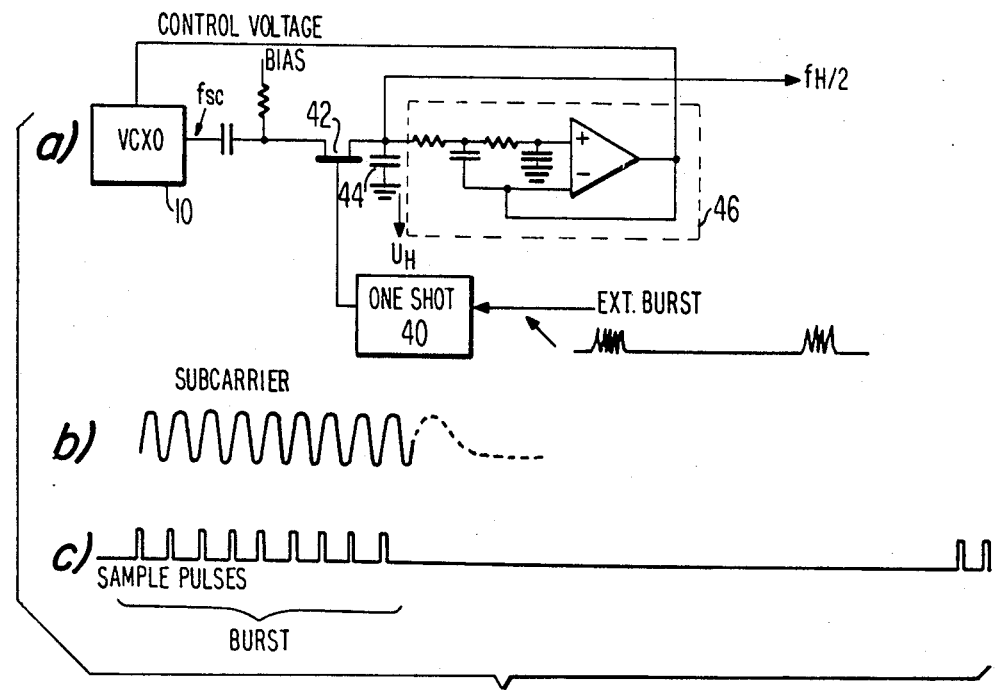

Genlocking the subcarrier generator of FIG. 4 is easy by simply replacing the $f_H/2$ or $2f_H$ signal by the external burst as shown in FIG. 5a. FIG. 5b shows the $f_{sc}$ signal produced, while FIG. 5c shows the sampling pulses supplied by one shot 40 from the external burst train. Note that for the embodiments of FIGS. 4 and 5 a 25 Hz phase comparator is not required, and that the output of sample switch 42 can be used to extract the $f_H/2$ sequence in PAL countries.

In particular, due to the swinging burst in PAL, the phase between the regenerated subcarrier and the external burst changes from line to line, thereby providing an AC component at $f_H/2$ in $U_H$ (FIG. 5a). This AC component is eliminated by LPF 46 so the control voltage for VCXO 10 is DC.

What is claimed is:

1. Apparatus comprising:
    a master oscillator;
    a sync generator having an input coupled to said master oscillator, a first output for providing a sampling signal, and a second output providing a one-half vertical frequency signal;
    a slave television color subcarrier frequency oscillator;
    a sampling means coupled to said slave oscillator and to said first output;
    a phase detector having inputs respectively coupled to said sampling means and to said second output, and an output coupled to said slave oscillator for frequency control thereof;
    whereby the frequency of said slave oscillator has a one-half vertical frequency offset.

2. Apparatus as claimed in claim 1, wherein said sampling signal has a frequency of one-quarter the horizontal frequency.

3. Apparatus as claimed in claim 1, further comprising a low pass filter coupled between said sampling means and said phase detector.

4. Apparatus as claimed in claim 3, further comprising a Schmitt trigger coupled between said filter and said phase detector.

5. Apparatus as claimed in claim 1, further comprising a integrator coupled between said phase detector and said slave oscillator.

6. Apparatus as claimed in claim 1, wherein said master oscillator has a frequency of 134 times the horizontal frequency.

7. Apparatus for generating a television color subcarrier signal, comprising:
    a master oscillator for providing a signal having a frequency which is an integer multiple of the television line scanning frequency;
    a synchronizing signal generating circuit having an input coupled to said master oscillator for providing at a plurality of outputs a plurality of television synchronizing signal components, one of said outputs providing a sampling signal having a frequency which is a small integer multiple of one-fourth the television line scanning frequency;
    a slave television color subcarrier oscillator for providing a color subcarrier frequency signal;
    a sampling means having a signal input coupled to receive said color subcarrier frequency signal and a sampling signal input responsive to said sampling signal; and
    a lowpass filter coupled to the output of said sampling means for providing at its output a frequency control signal which is applied to said slave oscillator for controlling its frequency.

8. Apparatus of claim 7 wherein said small integer multiple is one when generating a television color subcarrier signal in accordance with the PAL television signal standard.

9. Apparatus of claim 7 wherein said small integer multiple is two when generating a television color subcarrier signal in accordance with the NTSC television signal standard.

* * * * *